Figure 1:
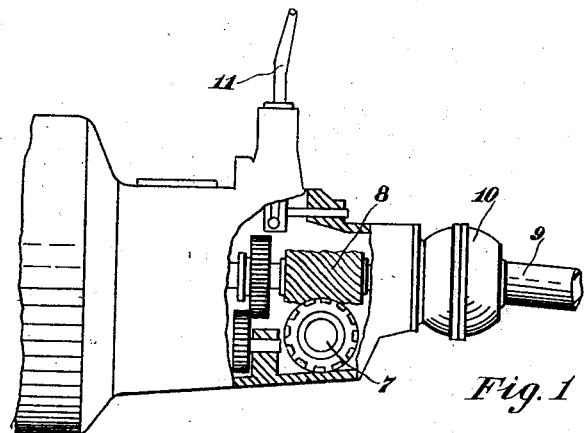

July 14, 1931.  W. B. CHARTERS  1,814,666

BRAKE

Filed Jan. 30, 1928

William B. Charters
Inventor

Attorney

Patented July 14, 1931

1,814,666

UNITED STATES PATENT OFFICE

WILLIAM BELL CHARTERS, OF SOOKE, BRITISH COLUMBIA, CANADA

BRAKE

Application filed January 30, 1928, Serial No. 250,663, and in Canada February 4, 1927.

This invention relates to brakes, and specifically to oil brakes for automotive vehicles where the oil is pumped through a variably restricted orifice or passage thereby setting up a resistance to the work of the pump or pumps. The object of the invention is to provide a brake having no appreciable wear and thus to eliminate the necessity for renewing frictional surfaces as is required by current practice. With this main object in view as well as other subsidiary ones I employ by preference a plurality of reciprocating pumps in which cylinders each having a single acting plunger or piston are mounted in conjunction with a common shaft, the latter being in suitable driving connection with the traction wheel or wheels according to design requirements. The shaft giving motion to the plungers is preferably but not necessarily driven through some form of reduction gear so that the pulsating motion of the plungers and valves is kept within reasonable limits, the plungers in the case of multiple pumps being arranged to operate in suitable alternate order so as to equalize as much as may be the flow of oil. The cylinders and valve connections may be in juxtaposition to the usual transmission gearing from which they receive motion by spiral gearing, thus the arrangement may be designed in a compact and serviceable form.

The character of the invention is clearly traced from a consideration of a pair of cylinders in axial alignment having their pistons moving together, and in separate connection with a common shaft by connecting rods, cranks, eccentrics or the like.

Each piston head is fitted with non-return valves of any suitable type so that oil may be expelled by the head of each piston as it moves radially outwards from the driving shaft. The delivery ends of the cylinders being connected by a conduit to a central chamber into which open the inner ends of the cylinders and the under and inner sides of the plungers. Thus a path is provided for the oil from the outer ends of the cylinders to their inner ends this path being intercepted at the junction of the two conduits with the central chamber by a suitable form of plug throttle valve having two independent paths through it, each of which is controlled by a non-return valve. By this arrangement the oil discharged from the head of one plunger or piston is diverted downwards through the plug into the aperture or conduit leading into the central chamber, and thence flows into the opposite and corresponding cylinder passing through the non-return valve in the head of the plunger thus filling up the displacement in that portion of the system. It will thus be observed that the oil circulation during one complete cycle takes the approximate form of a figure 8, and that the restriction of the double stream by the throttle valve sets up a corresponding reaction on the pistons which is transmitted to the drive shaft to absorb the momentum of the vehicle.

Figure 2:
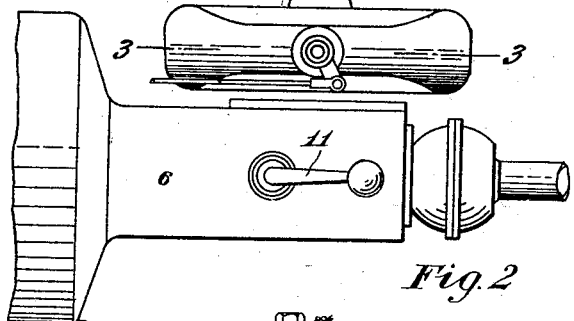
Figures 4, 5:
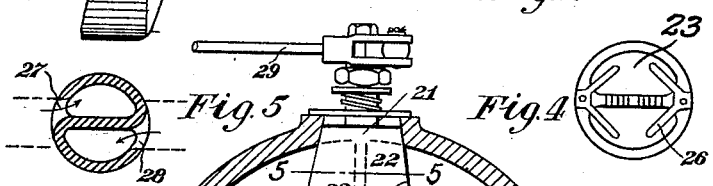
Figure 3:
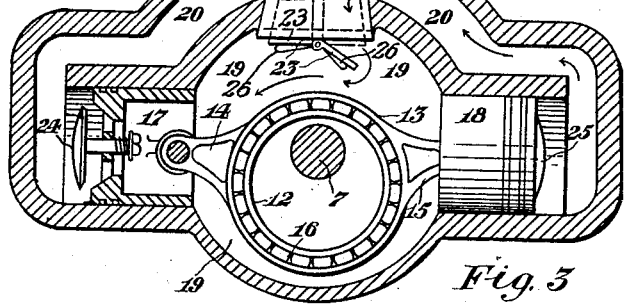

A simple embodiment of the device is shown in the drawings herewith which form part of this application and which Fig. 1 shows an ordinary transmission housing extended to provide room for driving the pump shaft, the side of the housing is broken away to expose the details, Fig. 2, is a plan of the housing shown in Fig. 1, with the pump case attached to the side of the transmission housing. Fig. 3 is a vertical section (to an enlarged scale) through the longitudinal centre of the pump case on line 3—3 of Figure 2. Fig. 4 is a view of the inner end of the throttle valve, and Fig. 5 is a view of the throttle valve plug in cross section on line 5—5 of Figure 3.

Taking the drawings in detail and noting that similar numerals in the different views indicate identical parts, the transmission housing of an ordinary automotive vehicle is shown at 6 and is extended to receive the pump shaft 7 which is driven by the spiral gear 8, this portion being immersed in oil, 9 is the main drive shaft and 10 encloses the universal joint, 11 indicates the position of the gear shift lever.

The special oil pump here indicated shows for the sake of clearness two cylinders, but in practice probably three or more will be preferable, secured on the pump shaft 7 is an eccentric sheave 12, around which move two eccentric straps 13, one of which is coupled to the connecting rod 14 and the other to the rod 15, 16 is an anti-friction device, the two pistons 17 and 18 move together but in opposite directions in their respective cylinders, the latter have their inner ends in connection with the central chamber 19 which encloses the shaft and eccentrics, the outer ends of the cylinders are each connected to a conduit 20 which is connected with the central chamber 19 only through the plug of the throttle valve 21 by the passages 22, the latter being fitted with the non-return valves 23, non-return valves are fitted to the head of each piston or plunger as shown at 24 and 25, the latter being closed because piston 18 is taking the delivery stroke and forcing the oil in the direction shown by the arrows into the conduit 20 and thence through its corresponding passage 22 in the throttle valve and the non-return valve 23 through the central chamber 19 and the piston valves 24, and so taking up the displacement in that cylinder as the piston moves inwards.

Meanwhile the oil in the left conduit 20 remains comparatively inert and the left hand valve in the throttle valve remains closed until the piston 17 commences its return stroke when the left hand half of the cycle is repeated in the same order as the right hand half, 26 indicates one of a pair of springs of flat steel adapted to close the valves 23 when the pressure is removed, the passages 27 and 28 indicate ports in the plug of the throttle valve 21 for admitting the flow of oil from the conduit 20 and diverting it downwards through the passages 22 and the valves 23 into the central chamber 19. The ports 27 and 28 may be restricted in area by movement of the plug of the valve 20, this may be effected by the rod and lever arrangement 29.

It will thus be observed that under normal running conditions, the oil will be in continuous and alternate motion, the contour of its path and its area being designed to give a minimum of friction to its passage, and that by suitably restricting the flow as described a corresponding reaction is set up which rapidly absorbs the momentum of the vehicle.

Having now ascertained the nature of my said invention and in what manner the same is to be performed, I declare that what I claim as mine and desire to secure by Letters Patent, is:

1. A brake mechanism for automotive vehicles comprising an oil pump, said pump consisting of a plurality of cylinders having pistons driven by suitable gear in connection with the driving axle of said vehicle, a non-return valve fitted in the head of each of said pistons, a central chamber connecting the inner ends of said cylinders, a conduit connecting the outer ends of said cylinders with the said central chamber, means whereby the flow of oil discharged from the outward ends of said pistons is delivered to the inward ends of the opposite and corresponding pistons, and adjustable means for restricting the said flow.

2. A brake mechanism for an automotive vehicle comprising an oil pump, said pump consisting of a plurality of cylinders having pistons in connection with and driven by suitable gear from the drive shaft of said vehicle, non-return valves fitted in the head of each of said pistons, a central chamber connecting the inner ends of said cylinders, a conduit connecting the outer ends of said cylinders with the said central chamber, and a throttle valve intercepting the said conduit.

3. A brake mechanism for an automotive vehicle comprising an oil pump, said pump consisting of a plurality of cylinders having pistons in connection with and driven by suitable reduction gear from the drive shaft of said vehicle, non-return valves fitted in the head of said pistons, a central chamber connected to the inner ends of said cylinders, a conduit connecting the outer ends of said cylinders with the said central chamber, a throttle valve intercepting the said conduit, said throttle valve being adapted to divert the flow from the outward end of said cylinders into the said central chamber, non-return valves fitted to the apertures in said throttle valve, means whereby the said flow may be restricted at the said throttle valve.

4. A brake mechanism for an automotive vehicle comprising an oil pump, said pump consisting of a plurality of cylinders having reciprocating pistons in connection with and driven by suitable reduction gear in connection with the driving axle of said vehicle, non-return valves fitted in the head of each of said pistons, a central chamber to which the inner ends of said cylinders are connected, a conduit connecting the outer ends of said cylinders with the said central chamber, a throttle valve intercepting the path of the said conduit making connection with said central chamber, said throttle valve having inlet and outlet apertures corresponding to the number of cylinders employed, the said apertures being fitted with non-return devices, means whereby the discharge of oil outwardly from the head of one said piston is delivered through the said throttle valve to the inward side of another said piston so as to flow outwardly through the head valve in the last said piston, means whereby when the said throttle valve is operated the passage of the said oil discharge is restricted as desired.

In testimony whereof, I affix my signature.

WILLIAM BELL CHARTERS.